US008542227B2

(12) United States Patent
You et al.

(10) Patent No.: US 8,542,227 B2
(45) Date of Patent: Sep. 24, 2013

(54) DISPLAY APPARATUS AND METHOD FOR DRIVING THE SAME

(75) Inventors: Hye-Ran You, Yongin-si (KR); Hee-Wook Do, Cheonan-si (KR); Seung-Hoo Yoo, Seongnam-si (KR); Sung-Min Kang, Seoul (KR); Hoon Kim, Ansan-si (KR); Hyun-Cheol Moon, Suwon-si (KR); Ho-Kyoon Kwon, Seoul (KR)

(73) Assignee: Samsung Display Co., Ltd., Yongin (KR)

( * ) Notice: Subject to any disclaimer, the term of this patent is extended or adjusted under 35 U.S.C. 154(b) by 970 days.

(21) Appl. No.: 12/022,512

(22) Filed: Jan. 30, 2008

(65) Prior Publication Data

US 2008/0186304 A1 Aug. 7, 2008

(30) Foreign Application Priority Data

Feb. 5, 2007 (KR) ........................ 10-2007-0011684
Feb. 16, 2007 (KR) ........................ 10-2007-0016458

(51) Int. Cl.
*G06F 3/038* (2013.01)
*G09G 5/00* (2006.01)

(52) U.S. Cl.
USPC .............. 345/212; 345/90; 345/204; 349/129

(58) Field of Classification Search
USPC ............. 345/212, 55, 87, 92, 204; 315/169.3
See application file for complete search history.

(56) References Cited

U.S. PATENT DOCUMENTS 6,525,704 B1 * 2/2003 Kondo et al. ................... 345/78
2005/0036091 A1 * 2/2005 Song ............................. 349/129

FOREIGN PATENT DOCUMENTS

JP 2003-195354 7/2003
KR 10-2005-0000828 1/2005
KR 10-2006-0076845 7/2006

* cited by examiner

*Primary Examiner* — Kevin M Nguyen
*Assistant Examiner* — Kenneth B Lee, Jr.
(74) *Attorney, Agent, or Firm* — H.C. Park & Associates, PLC

(57) ABSTRACT

In a display apparatus, pixels are arranged in a matrix defined by gate lines and data lines, and each pixel includes a first sub pixel charged to a first pixel voltage and a second sub pixel charged to a second pixel voltage having a same voltage level as the first pixel voltage. A voltage controller controls a voltage level of the first and second pixel voltages charged in the pixels corresponding to the first through penultimate pixel rows in response to a next gate signal. A dummy voltage controller controls a voltage level of the first and second pixel voltages charged in the pixels corresponding to the last pixel row in response to a dummy gate signal. Where a dummy voltage controller is not included, a black matrix partially covers the efficient display area of the pixels corresponding to the last pixel row.

23 Claims, 15 Drawing Sheets

DISPLAY APPARATUS AND METHOD FOR DRIVING THE SAME

CROSS-REFERENCE TO RELATED APPLICATION

This application claims priority from and the benefit of Korean Patent Application No. 2007-11684, filed on Feb. 5, 2007, and Korean Patent Application No. 2007-16458, filed on Feb. 16, 2007, which are hereby incorporated by reference for all purposes as if fully set forth herein.

BACKGROUND OF THE INVENTION

1. Field of the Invention

The present invention relates to a display apparatus and a method for driving the same, and more specifically, to a display apparatus capable of improving a display quality and a method for driving the display apparatus.

2. Discussion of the Background

In general, a liquid crystal display (LCD) includes a liquid crystal display panel (LCD panel) for displaying an image. The LCD panel has a lower substrate, an upper substrate facing the lower substrate, and a liquid crystal layer interposed between the lower substrate and the upper substrate. The lower substrate of the LCD panel includes gate lines, data lines and pixels. Each pixel is electrically connected to a corresponding gate line and a corresponding data line.

The LCD may have a narrower viewing angle than other display apparatuses. In order to improve the narrower viewing angle of the LCD, various driving modes have been suggested, including the patterned vertical alignment (PVA) mode, the multi-domain vertical alignment (MVA) mode, and the super patterned vertical alignment (SPVA) mode.

Each pixel in an LCD driven in SPVA mode includes a main pixel and a sub pixel. In order to form domains having different gray scales from each other in each pixel, the main pixel and the sub pixel include a main pixel electrode and a sub pixel electrode, respectively. Further, a main pixel voltage and a sub pixel voltage, having different voltage levels from each other, are applied to the main pixel electrode and the sub pixel electrode, respectively. As human eyes recognize an intermediate value between the main pixel voltage and the sub pixel voltage, degradation of a side viewing angle caused by distortion of a gamma curve under an intermediate grayscale value is prevented. Therefore, side visibility of the LCD is improved and the narrower viewing angle is widened.

The SPVA mode LCD may be classified as a coupling capacitor (CC) type or a two-transistor (TT) type according to a driving method thereof. In the CC-type, a coupling capacitor is coupled between the main pixel electrode and the sub pixel electrode to level down a data voltage applied to the sub pixel electrode. The sub pixel voltage, which has a lower voltage level than that of the main pixel voltage, is charged in the sub pixel by the coupling capacitor. In the TT-type, a first transistor is connected to the main pixel electrode to supply the main pixel voltage, and a second transistor is connected to the sub pixel electrode to supply the sub pixel voltage. Also, the main pixel voltage has a voltage level different than the voltage level of the sub pixel voltage.

Recently, in order to improve brightness reduction and an afterimage phenomenon that may occur in the CC-type SPVA mode LCD, a charge sharing (CS) type has been suggested. However, in the CS-type SPVA mode LCD, the main pixel voltage and the sub pixel voltage respectively applied to the main pixel and the sub pixel are controlled during a next horizontal scanning period. However, the main pixel voltage and the sub pixel voltage applied to the main pixel and the sub pixel connected to a last gate line are not controlled since there is no next horizontal scanning period after the last gate line. As a result, a whitening phenomenon may occur where the pixels connected to the last gate line emit a brighter light than the light emitted by other pixels in the display apparatus.

SUMMARY OF THE INVENTION

This invention provides a display apparatus to reduce a whitening phenomenon in pixels associated with a last gate line in a CS-type SPVA mode LCD.

The present invention also provides a method for driving the display apparatus.

Additional features of the invention will be set forth in the description which follows, and in part will be apparent from the description, or may be learned by practice of the invention.

The present invention discloses a display apparatus including a plurality of gate lines, a plurality of data lines, and a plurality of pixels. The gate lines receive a plurality of gate signals, and the data lines receive a data signal. The pixels are arranged in pixel areas defined by a crossing arrangement of the gate lines and the data lines. Each pixel includes a first sub pixel being charged to a first pixel voltage and a second sub pixel being charged to a second pixel voltage. A pixel corresponding to a penultimate gate line further includes a voltage controller to increase the first pixel voltage and decrease the second pixel voltage charged in the pixel corresponding to the penultimate gate line in response to a last gate signal. A pixel corresponding to a last gate line further includes a dummy voltage controller to increase the first pixel voltage and decrease the second pixel voltage charged in the pixel corresponding to the last gate line in response to a dummy gate signal.

The present invention also discloses a display apparatus including a first base substrate, a second base substrate facing the first base substrate, a plurality of gate lines arranged on the first base substrate to sequentially receive a plurality of gate signals, a plurality of data lines to receive a data signal, the data lines being electrically insulated from and crossing with the gate lines to define a plurality of pixel areas, a plurality of pixels arranged by row in the pixel areas, wherein each row of pixels corresponds to one of the plurality of gate lines, and a black matrix disposed between the first base substrate and the second base substrate to partially cover an effective display area of a pixel corresponding to a last gate line. Further, each pixel includes a first sub pixel to receive the data signal in response to a corresponding gate signal, the first sub pixel being charged to a first pixel voltage, and a second sub pixel to receive the data signal in response to the corresponding gate signal, the second sub pixel being charged to a second pixel voltage. Additionally, a pixel corresponding to a gate line other than the last gate line further includes a voltage controller to control the first pixel voltage and the second pixel voltage in response to a next gate signal after the corresponding gate signal.

The present invention also discloses a method for driving a display apparatus. The method includes charging a first sub pixel to a first pixel voltage and charging a second sub pixel to a second pixel voltage in response to a present gate signal, the first sub pixel and the second sub pixel being arranged in a first pixel corresponding to a last pixel row, controlling a voltage level of a third pixel voltage charged in a third sub pixel and a fourth pixel voltage charged in a fourth sub pixel in response to the present gate signal, the third sub pixel and the fourth sub pixel being arranged in a second pixel corresponding to a previous pixel row before the last pixel row, and controlling a voltage level of the first pixel voltage and the second pixel voltage in response to a dummy gate signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
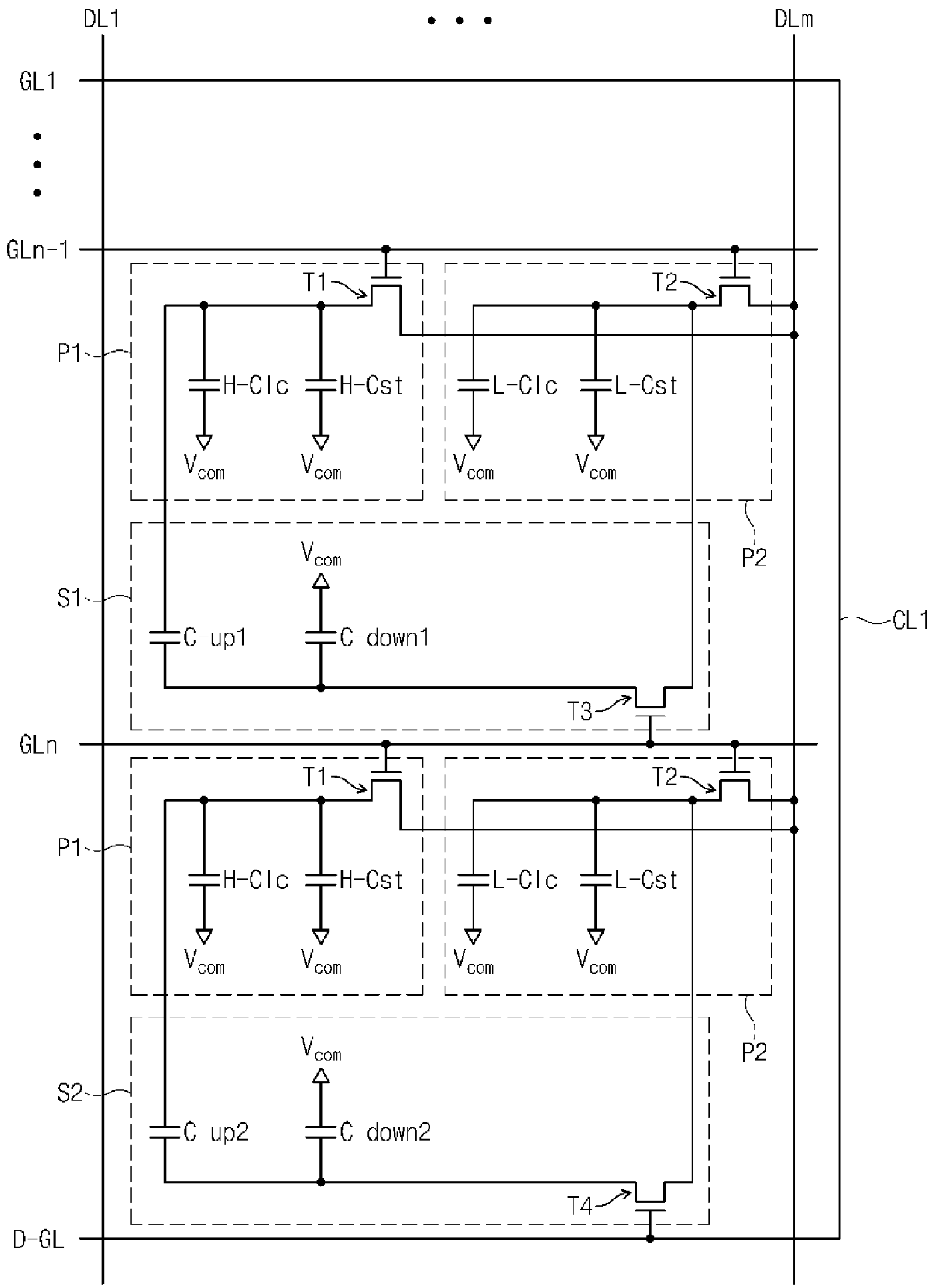
FIG. 1 is an equivalent circuit diagram showing an exemplary embodiment of a pixel part arranged in a display apparatus according to an exemplary embodiment of the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" or "connected to" another element, it can be directly on or directly connected to the other element or intervening elements may be present therebetween. In contrast, when an element is referred to as being "directly on" or "directly connected to" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be explained in detail with reference to the accompanying drawings.

FIG. 1 is an equivalent circuit diagram showing an exemplary embodiment of a pixel part arranged in a display apparatus according to an exemplary embodiment of the present invention.

Referring to FIG. 1, a display apparatus according to an exemplary embodiment of the present invention includes first to n-th gate lines GL1 to GLn, first to m-th data lines DL1 to DLm, a dummy gate line D-GL, and a first connection line CL1. Pixel areas are arranged in a matrix defined by the first to n-th gate lines GL1 to GLn crossing with the first to m-th data lines DL1 to DLm, and a pixel is arranged in each pixel area.

In FIG. 1, an (n−1)-th pixel is connected to the (n−1)-th gate line GLn−1 and the m-th data line DLm, and an n-th pixel is connected to the n-th gate line GLn and the m-th data line DLm. The (n−1)-th pixel may be in the second to last row of pixels, which may be referred to the as the penultimate row of pixels. The n-th pixel may be in the last row of pixels. The penultimate row of pixels may be connected to the (n−1)-th gate line or penultimate gate line GLn−1, and the last row of pixels may be connected to the n-th gate line or last gate line GLn. In the present exemplary embodiment, since the pixels all have a substantially similar structure and function, the n-th pixel will be described in detail unless stated otherwise.

The n-th pixel includes a first sub pixel P1 and a second sub pixel P2. The first sub pixel P1 includes a first thin film transistor (TFT) T1, a first liquid crystal capacitor H-Clc, and a first storage capacitor H-Cst. The second sub pixel P2 includes a second TFT T2, a second liquid crystal capacitor L-Clc and a second storage capacitor L-Cst.

More specifically, the first TFT T1 includes a first gate electrode connected to the n-th gate line GLn, a first source electrode connected to the m-th data line DLm, and a first drain electrode connected to the first liquid crystal capacitor H-Clc. The first liquid crystal capacitor H-Clc includes a first pixel electrode connected to the first drain electrode, a common electrode facing the first pixel electrode and receiving a common voltage Vcom, and a liquid crystal layer (not shown) interposed between the first pixel electrode and the common electrode. The first storage capacitor H-Cst includes the first pixel electrode, a storage electrode receiving the common voltage Vcom, and an insulation layer interposed between the first pixel electrode and the storage electrode.

The second TFT T2 includes a second gate electrode connected to the n-th gate line GLn, a second source electrode connected to the m-th data line DLm, and a second drain electrode connected to the second liquid crystal capacitor L-Clc. The second liquid crystal capacitor L-Clc includes a second pixel electrode connected to the second drain electrode, the common electrode facing the second pixel electrode, and the liquid crystal layer interposed between the second pixel electrode and the common electrode. The second storage capacitor L-Cst includes the second pixel electrode, the storage electrode, and the insulation layer interposed between the second pixel electrode and the storage electrode.

Gate signals are sequentially applied to the first to n-th gate lines GL1 to GLn during one frame. A period when a gate signal has a high level is defined as a horizontal scanning period 1H, and the first to n-th gate signals G1 to Gn are applied to the first to n-th gate lines GL1 to GLn. An operation that sequentially applies the first to n-th gate signals to the first to n-th gate lines GL1 to GLn, respectively, is performed in every frame.

The first to m-th data lines DL1 to DLm receive data signals. The data signals are applied to the first to m-th data lines DL1 to DLm in synchronization with the gate signals sequentially applied to the first to n-th gate lines GL1 to GLn.

As shown in FIG. 1, when an (n−1)-th gate signal is applied to the (n−1)-th gate line GLn−1, the first TFT T1 and the second TFT T2, respectively arranged in the first sub pixel P1 and the second sub pixel P2, are turned on in response to the (n−1)-th gate signal. The m-th data signal Dm applied to the m-th data line DLm is transmitted to the first pixel electrode of the first liquid crystal capacitor H-Clc and to the second pixel electrode of the second liquid crystal capacitor L-Clc via the first TFT T1 and the second TFT T2, respectively. Since the first pixel electrode and the second pixel electrode each receive the same m-th data signal Dm, the first liquid crystal capacitor H-Clc and the second liquid crystal capacitor L-Clc are charged to a same voltage level. In the present exemplary embodiment, voltages charged in the first liquid crystal capacitor H-Clc and the second liquid crystal capacitor L-Clc are defined as a first pixel voltage and a second pixel voltage, respectively, and the first pixel voltage and the second pixel voltage have a same voltage level during an (n−1)-th horizontal scanning period 1H.

The (n−1)-th pixel includes a voltage controller S1 connected to the n-th gate line GLn and the (n−1)-th pixel to control the voltage level of the first pixel voltage and the second pixel voltage charged in the first sub pixel P1 and the second sub pixel P2, respectively, of the (n−1)-th pixel.

The voltage controller S1 in the (n−1)-th pixel includes a third TFT T3, a first control capacitor C-down1 and a second control capacitor C-up1. The third TFT T3 includes a third gate electrode connected to the n-th gate line, a third source electrode connected to the second pixel electrode of the second sub pixel P2 in the (n−1)-th pixel, and a third drain electrode connected to the first control capacitor C-down1 and the second control capacitor C-up1.

The first control capacitor C-down1 includes the storage electrode, a first opposite electrode partially overlapping with the storage electrode and connected to the third drain electrode, and an insulation layer interposed between the first opposite electrode and the storage electrode. The second control capacitor C-up1 includes the first pixel electrode of the first sub pixel P1 in the (n−1)-th pixel, the first opposite electrode partially overlapping with the first pixel electrode, and the insulation layer interposed between the first pixel electrode and the first opposite electrode.

When the third TFT T3 is turned on in response to the n-th gate signal applied to the n-th gate line, the second pixel electrode and the first opposite electrode are connected to each other by the third TFT T3. Thus, a voltage level of the first pixel voltage charged in the first liquid crystal capacitor H-Clc and a voltage level of the second pixel voltage charged in the second liquid crystal capacitor L-Clc are controlled by the first control capacitor C-down1 and the second control capacitor C-up1. Specifically, depending upon the relative capacitances, the first pixel voltage may increase and the second pixel voltage may decrease due to the first control capacitor C-down1 and the second control capacitor C-up1 when the third TFT T3 is turned on. An increase of the first pixel voltage and a decrease of the second pixel voltage may vary according to relative capacitances of the first control capacitor C-down1 and the second control capacitor C-up1.

The n-th pixel includes a dummy voltage controller S2 connected to the dummy gate line D-GL and the n-th pixel to control a voltage level of the first pixel voltage and the second pixel voltage charged in the first sub pixel P1 and the second sub pixel P2, respectively, of the n-th pixel.

The dummy voltage controller S2 includes a fourth TFT T4, a third control capacitor C-down2 and a fourth control capacitor C-up2. The fourth TFT T4 includes a fourth gate electrode connected to the dummy gate line D-GL, a fourth source electrode connected to the second pixel electrode of the second sub pixel P2 in the n-th pixel, and a fourth drain electrode connected to the third control capacitor C-down2 and the fourth control capacitor C-up2.

The third control capacitor C-down2 includes the storage electrode, a second opposite electrode partially overlapping with the storage electrode and connected to the fourth drain electrode, and an insulation layer interposed between the second opposite electrode and the storage electrode. The fourth control capacitor C-up2 includes the first pixel electrode of the first sub pixel P1 in the n-th pixel, the second opposite electrode partially overlapping with the first pixel electrode, and the insulation layer interposed between the second opposite electrode and the first pixel electrode.

When the fourth TFT T4 is turned on in response to a dummy gate signal applied to the dummy gate line D-GL, the second pixel electrode of the second sub pixel P2 in the n-th pixel and the second opposite electrode are connected to each other by the fourth TFT T4. A voltage level of the first pixel voltage charged in the first liquid crystal capacitor H-Clc and a voltage level of the second pixel voltage charged in the second liquid crystal capacitor L-Clc are controlled by the third control capacitor C-down2 and the fourth control capacitor C-up2. Specifically, depending upon the relative capacitances, the first pixel voltage may increase and the second pixel voltage may decrease due to the third control capacitor C-down2 and the fourth control capacitor C-up2 when the fourth TFT T4 is turned on. An increase of the first pixel voltage and a decrease of the second pixel voltage may vary according to relative capacitances of the third control capacitor C-down2 and the fourth control capacitor C-up2.

As shown in FIG. 1, the dummy gate line D-GL is connected to the first gate line GL1 through a first connection line CL1. Therefore, a first gate signal applied to the first gate line GL1 is transmitted to the dummy gate line D-GL. When the first gate signal is applied to the first gate line GL1 in a next frame after the n-th pixel is turned on in a present frame, the dummy voltage controller S2 controls the voltage level of the first pixel voltage and the second pixel voltage that are charged in the n-th pixel.

Figure 2A:
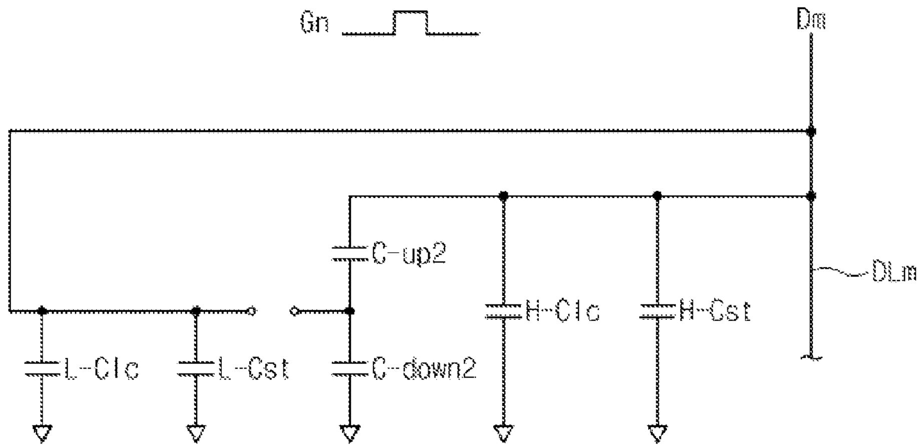
FIG. 2A is an equivalent circuit diagram of an n-th pixel when an n-th gate signal is applied to an n-th gate line shown in FIG. 1.
Figure 2B:
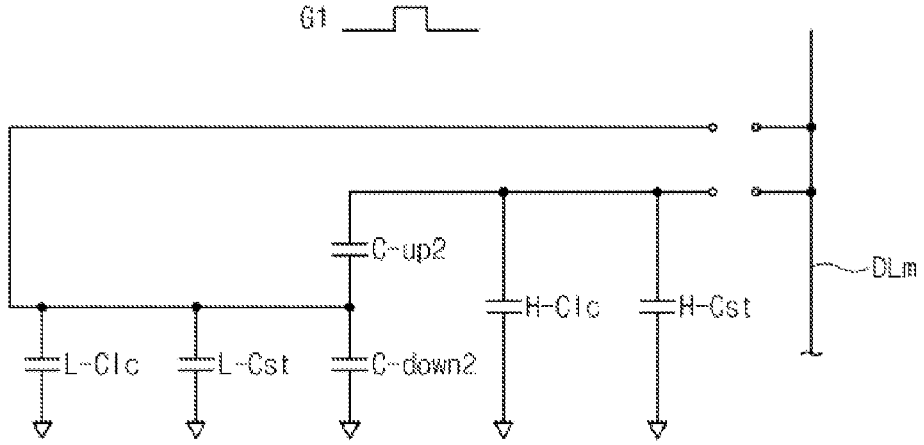
FIG. 2B is an equivalent circuit diagram of an n-th pixel when a first gate signal is applied to a dummy gate line shown in FIG. 1.
Figure 3:
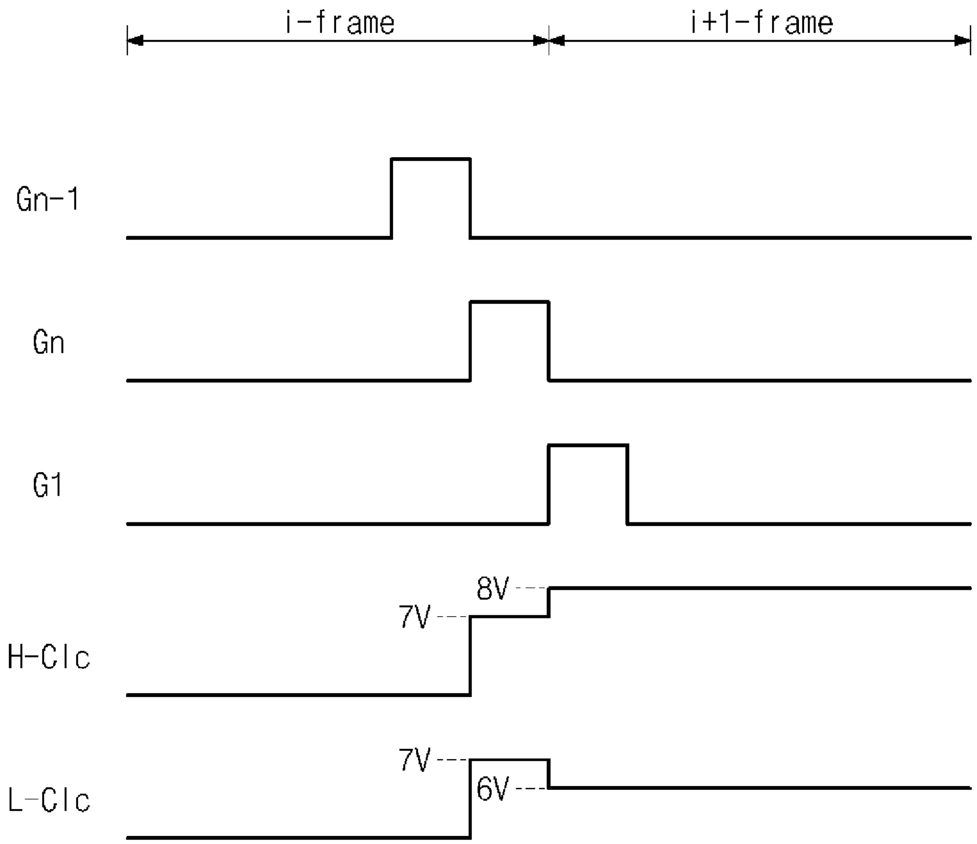
FIG. 3 is a waveform diagram showing variations of first and second pixel voltages according to the n-th gate signal and the first gate signal.

FIG. 2A is an equivalent circuit diagram of an n-th pixel when an n-th gate signal is applied to an n-th gate line shown in FIG. 1. FIG. 2B is an equivalent circuit diagram of an n-th pixel when a first gate signal is applied to a dummy gate line D-GL shown in FIG. 1. FIG. 3 is a waveform diagram showing variations of the first pixel voltage and the second pixel voltage according to the n-th gate signal and the first gate signal.

Referring to FIG. 2A and FIG. 3, when the n-th gate signal Gn is generated in an i-th frame, the first TFT T1 and the second TFT T2 are turned on. An m-th data signal Dm, applied to the m-th data line DLm, is transmitted to the first liquid crystal capacitor H-Clc and the second liquid crystal capacitor L-Clc via the first TFT T1 and the second TFT T2, respectively. As a result, the first pixel voltage and the second pixel voltage are charged in the first liquid crystal capacitor H-Clc and the second liquid crystal capacitor L-Clc, respectively. As shown in FIG. 3, according to an exemplary embodiment of the present invention, the first pixel voltage and the second pixel voltage may have a voltage level of about 7 volts.

The third control capacitor C-down2 and the fourth control capacitor C-up2 are connected to each other in series and connected with the first liquid crystal capacitor H-Clc in parallel. In the present exemplary embodiment, the third control capacitor C-down2 and the fourth control capacitor C-up2 may be charged to voltage levels of about 5 volts and about 2 volts, respectively, by a voltage division.

Referring to FIG. 2B and FIG. 3, the fourth TFT T4 of the dummy voltage controller S2 is turned on in response to the first gate signal G1 applied to the first gate line GL1 in an (i+1)-th frame. The second liquid crystal capacitor L-Clc and the third control capacitor C-down2 are connected to each other in parallel via the fourth TFT T4.

Accordingly, a charge-sharing event between the second liquid crystal capacitor L-Clc and the third control capacitor C-down2 occurs, so that the second pixel voltage charged in the second liquid crystal capacitor L-Clc and the voltage charged in the third control capacitor C-down2 become equal to about 6 volts. As the voltage charged in the third control capacitor C-down2 increases, a summation of the voltages charged in the third control capacitor C-down2 and the fourth control capacitor C-up2 increases from about 7 volts to about 8 volts, and the first pixel voltage charged in the first liquid crystal capacitor H-Clc also increases to about 8 volts. As a result, when the first gate signal G1 is generated, the first pixel voltage increases from about 7 volts to about 8 volts, and the second pixel voltage decreases from about 7 volts to about 6 volts.

As described above, when different voltages are charged in the first sub pixel P1 and the second sub pixel P2, liquid crystal molecules included in the liquid crystal layer are aligned in different directions in two areas where the first sub pixel P1 and the second sub pixel P2 are arranged, respectively. So, the first sub pixel P1 and the second sub pixel P2 display two images each having different gray scales, and a user viewing the display apparatus views an image mixed with the two images displayed in the first sub pixel P1 and the second sub pixel P2. Therefore, a side visibility of the display apparatus may be improved.

Figure 4:
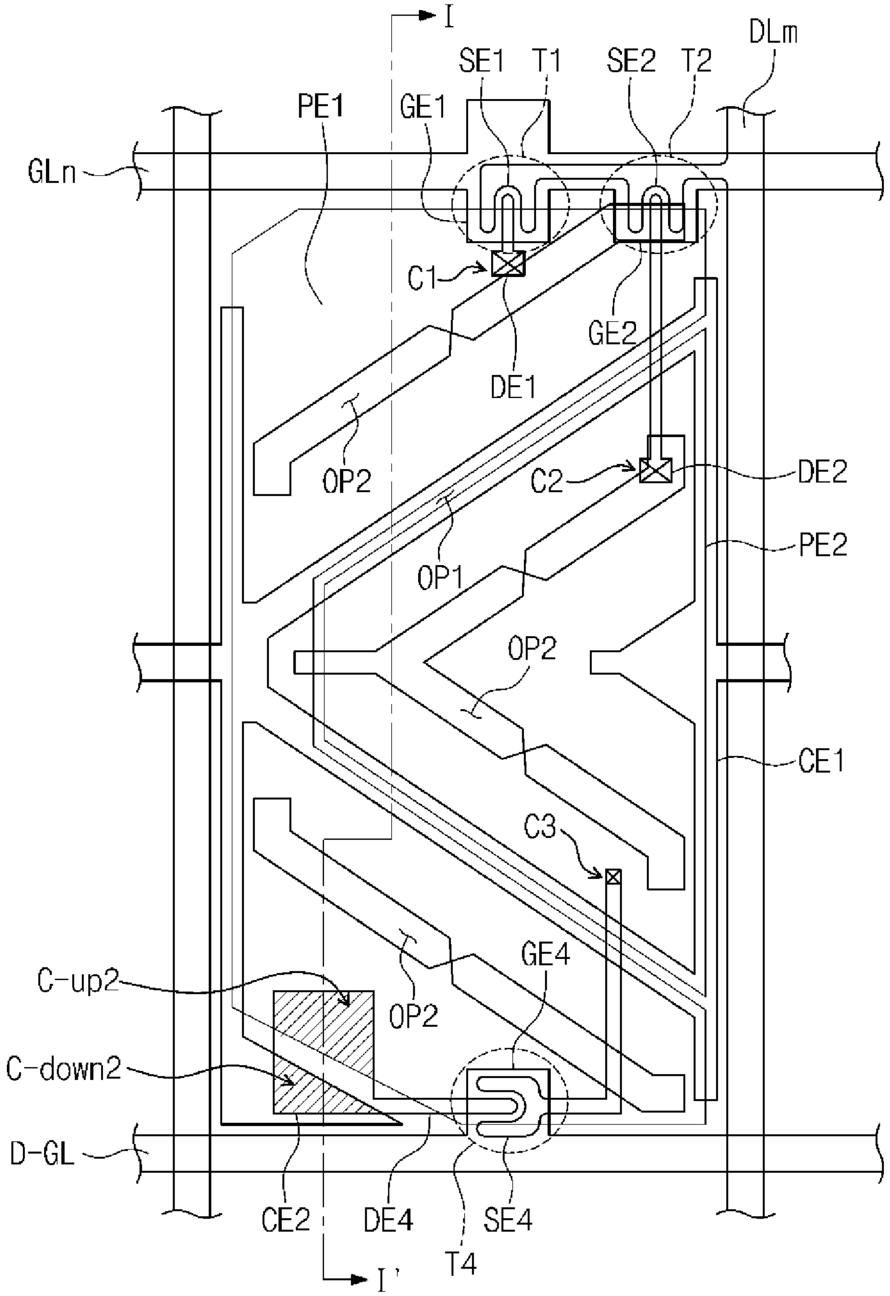
FIG. 4 is a layout diagram of the n-th pixel shown in FIG. 1.
Figure 5:
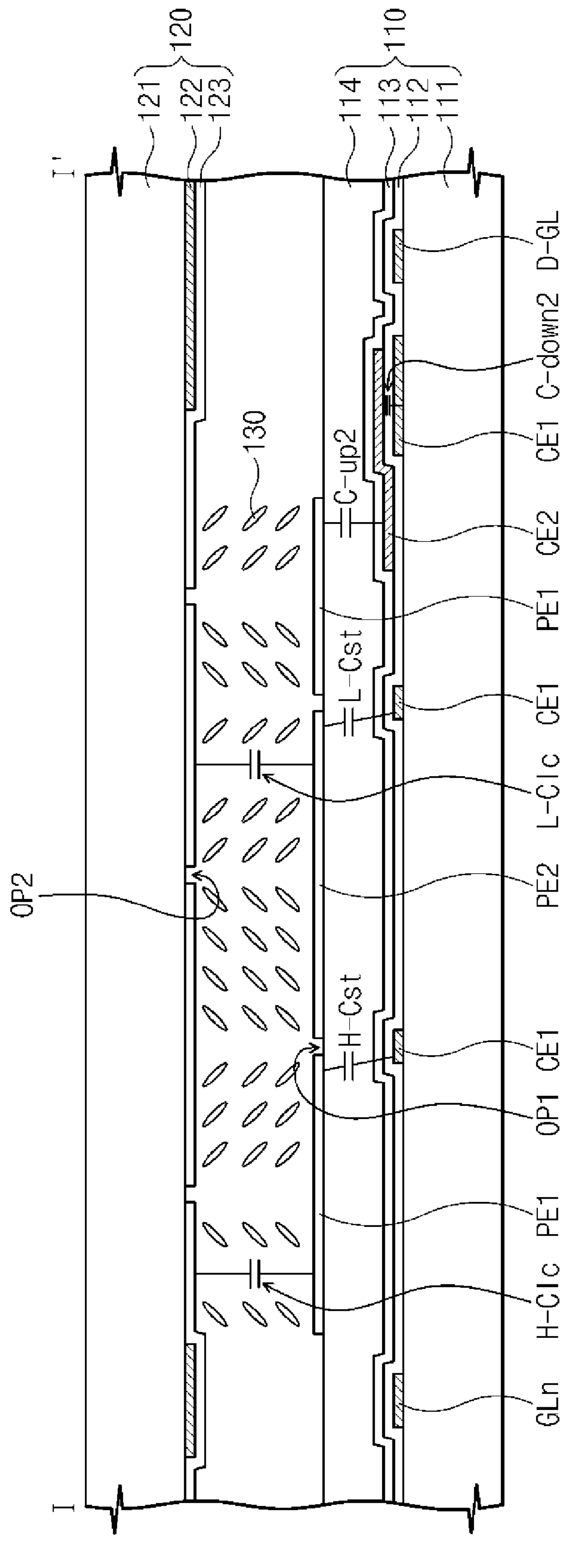
FIG. 5 is a sectional view taken along line I-I' shown in FIG. 4.

FIG. 4 is a layout diagram of the n-th pixel shown in FIG. 1, and FIG. 5 is a sectional view taken along line I-I' shown in FIG. 4.

Referring to FIG. 4 and FIG. 5, the display apparatus includes an array substrate 110, an opposite substrate 120 facing the array substrate 110, and a liquid crystal layer 130 interposed between the array substrate 110 and the opposite substrate 120.

The n-th gate line GLn, the dummy gate line D-GL, and the storage electrode CE1 are formed on a first base substrate 111 of the array substrate 110 using a gate metal. The n-th gate line GLn and the dummy gate line D-GL are arranged substantially parallel with each other. The storage electrode CE1 is disposed between the n-th gate line GLn and the dummy gate line D-GL and electrically insulated from the n-th gate line GLn and the dummy gate line D-GL. The storage electrode CE1 receives the common voltage, the n-th gate line GL1 receives the n-th gate signal Gn, and the dummy gate line D-GL receives the dummy gate signal.

The first gate electrode GE1, the second gate electrode GE2, and the fourth gate electrode GE4 are disposed on the first base substrate 111. The first gate electrode GE1 and the second gate electrode GE2 extend from the n-th gate line GLn, and the fourth gate electrode GE4 extends from the dummy gate line D-GL.

The gate insulation layer 112 is provided on the first base substrate 111 to cover the n-th gate line GLn, the dummy gate line D-GL, the storage electrode CE1, the first gate electrode GE1, the second gate electrode GE2, and the fourth gate electrode GE4. The m-th data line DLm, a first source electrode SE1, a second source electrode SE2, a first drain electrode DE1, and a second drain electrode DE2 are formed on the gate insulation layer 112. The first source electrode SE1 and the second source electrode SE2 extend from the m-th data line DLm, and the first drain electrode DE1 and the second drain electrode DE2 are spaced apart from the first source electrode SE1 and the second source electrode SE2, respectively. Thus, the first TFT T1 includes the first gate electrode GE1, the first source electrode SE1, and the first drain electrode DEL arranged on the array substrate 110, and the second TFT T2 includes the second gate electrode GE2, the second source electrode SE2, and the second drain electrode DE2 arranged on the array substrate 110.

Also, a fourth source electrode SE4 and a fourth drain electrode DE4 are arranged on the gate insulation layer 112 corresponding to the fourth gate electrode GE4 and spaced apart from each other. Accordingly, the fourth TFT T4 includes the fourth gate electrode GE4, the fourth source electrode SE4, and the fourth drain electrode DE4 arranged on the array substrate 110. The second opposite electrode CE2 is disposed on the gate insulation layer 112 and extends from the fourth drain electrode DE4. The second opposite electrode CE2 partially overlaps with the storage electrode CE1. The third control capacitor C-down2 is arranged in an area where the second opposite electrode CE2 and the storage electrode CE1 overlap with each other.

The array substrate 110 includes a passivation layer 113 and an organic insulation layer 114, which both cover the second opposite electrode CE2, the first TFT T1, the second TFT T2, and the fourth TFT T4. The passivation layer 113 and the organic insulation layer 114 are sequentially arranged on the gate insulation layer 112. The passivation layer 113 and the organic insulation layer 114 include a first contact hole C1, a second contact hole C2, and a third contact hole C3 formed therethrough. The first contact hole C1 exposes the first drain electrode DE1, the second contact hole C2 exposes the second drain electrode DE2, and the third contact hole C3 exposes the fourth source electrode SE4.

The first pixel electrode PE1 and the second pixel electrode PE2 are arranged on the organic insulation layer 114. An first opening OP1 is arranged between the first pixel electrode PE1 and the second pixel electrode PE2 to electrically insulate the first pixel electrode PE1 and the second pixel electrode PE2 from each other.

The first pixel electrode PE1 is connected to the first drain electrode DE1 via the first contact hole C1, and the second pixel electrode PE2 is connected to the second drain electrode DE2 via the second contact hole C2. The first pixel electrode PE1 partially overlaps with the storage electrode CE1 to form the first storage capacitor H-Cst, and the second pixel electrode PE2 partially overlaps with the storage electrode CE1 to form the second storage capacitor L-Cst.

The second pixel electrode PE2 is connected to the fourth source electrode SE4 via the third contact hole C3, and the first pixel electrode PE1 partially overlaps with the second opposite electrode CE2. As a result, the fourth control capacitor C-up2 is arranged in an area where the first pixel electrode PE1 and the second opposite electrode CE2 overlap with each other.

The opposite substrate 120 includes a second base substrate 121, a black matrix 122, and a common electrode 123. The black matrix 122 is arranged on the second base substrate 121 corresponding to a non-effective display area, and the common electrode 123 is arranged on the second base substrate 121 and the black matrix 122. A second opening OP2 is arranged in the common electrode 123 to divide the first pixel electrode PE1 and the second pixel electrode PE2 into domains. The second opening OP2 is arranged such that a position of the second opening OP2 does not correspond with a position of the first opening OP1.

The liquid crystal layer 130 is interposed between the array substrate 110 and the opposite substrate 120. Thus, the first liquid crystal capacitor H-Clc includes the common electrode 123, the first pixel electrode PE1, and the liquid crystal layer 130, and the second liquid crystal capacitor L-Clc includes the common electrode 123, the second pixel electrode PE2, and the liquid crystal layer 130.

In FIGS. 1 to 5, each of the voltage controller S1 and the dummy voltage controller S2 includes a transistor T3 or T4, a down capacitor C-down1 or C-down2, and an up capacitor C-up1 or C-up2. However, in another exemplary embodiment, each of the voltage controller S1 and the dummy voltage controller S2 may include a transistor T3 or T4, and a down capacitor C-down1 or C-down2. In another exemplary embodiment, the transistor T4 of the dummy voltage controller S2 is connected to the first gate line GL1 via the dummy gate line D-GL to receive the first gate signal as the dummy gate signal. Therefore, when the transistor T4 is turned on in response to the first gate signal, the second pixel voltage charged in the second liquid crystal capacitor L-Clc decreases to the voltage charged in the down capacitor C-down2.

Figure 6:
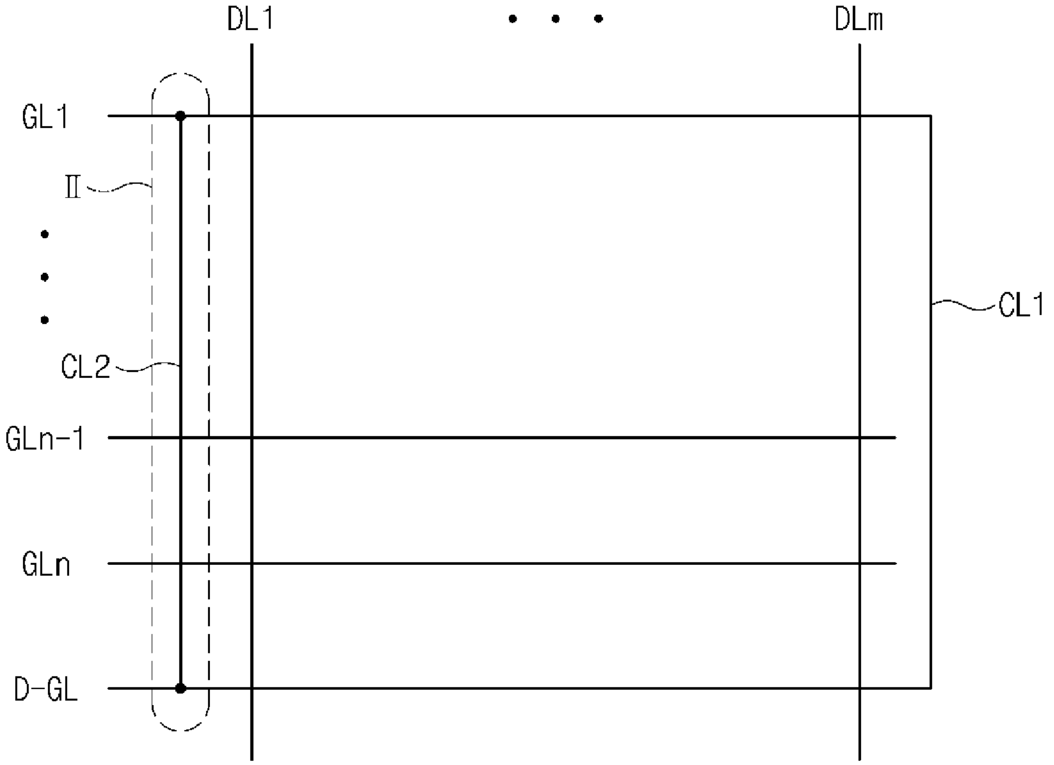
FIG. 6 is a plan view showing a connection between a dummy gate line and a first gate line according to another exemplary embodiment of the present invention.
Figure 7:
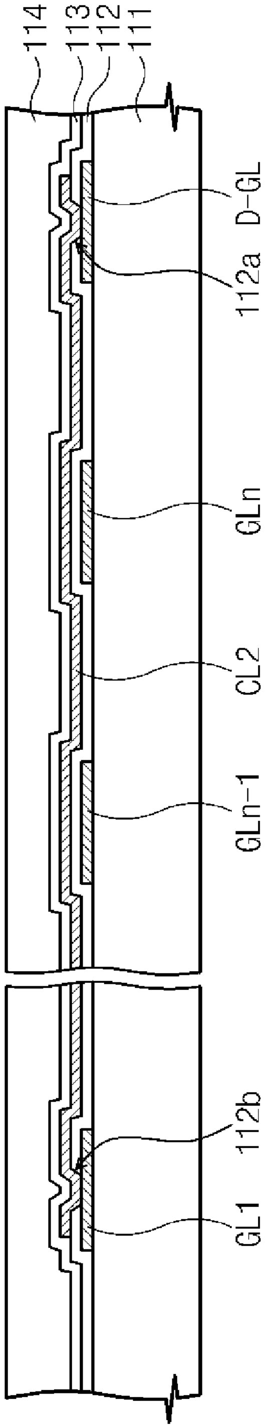
FIG. 7 is a sectional view showing region II of FIG. 6.

FIG. 6 is a plan view showing a connection between the dummy gate line and the first gate line according to another exemplary embodiment of the present invention. FIG. 7 is a sectional view showing region II of FIG. 6.

Referring to FIG. 6 and FIG. 7, the first connection line CL1 connects the dummy gate line D-GL to the first gate line GL1. The first connection line CL1 connects a first end portion of the first gate line GL1 to a first end portion of the dummy gate line D-GL. The first connection line CL1 is arranged outside an area where the first to n-th gate lines GL1 to GLn are formed, so that the first connection line CL1 does not cross with the first to n-th gate lines GL1 to GLn. In the present exemplary embodiment, the first connection line CL1 may be formed of a same metal as the first to n-th gate lines GL1 to GLn.

Also, the dummy gate line D-GL and the first gate line GL1 may be connected to each other by a second connection line CL2. The second connection line CL2 connects a second end portion of the first gate line GL1 to a second end portion of the dummy gate line D-GL. The second connection line CL2 may be arranged in an area where the first to n-th gate lines GL1 to GLn are formed. The second connection line CL2 may be formed of a same metal as the first to m-th data lines DL1 to DLm, so that the second connection line CL2 is electrically insulated from and crossing with the first to n-th gate lines GL1 to GLn.

As shown in FIG. 7, the second connection line CL2 is arranged on the gate insulation layer 112 that covers the first to n-th gate lines GL1 to GLn. The gate insulation layer 112 may include a fourth contact hole 112*a* exposing the second end portion of the dummy gate line D-GL and a fifth contact hole 112*b* exposing the second end portion of the first gate line GL1. The second connection line CL2 is connected to the second end portion of the dummy gate line D-GL and the second end portion of the first gate line GL1 via the fourth contact hole 112*a* and the fifth contact hole 112*b*, respectively.

As the dummy gate line D-GL is connected to the first gate line GL1 by the first connection line CL1 and the second connection line CL2, a time to transmit the first gate signal G1 applied to the first gate line GL1 to the dummy gate line D-GL may be reduced.

Figure 8:
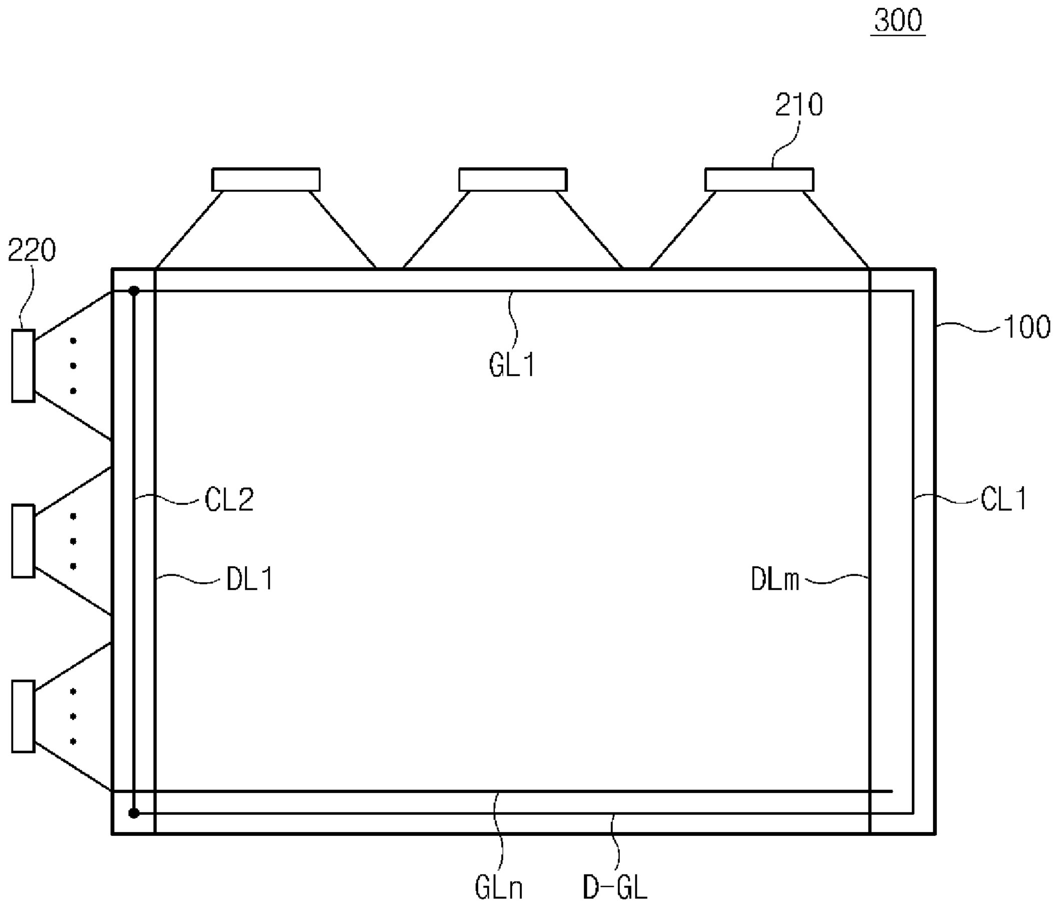
FIG. 8 is a plan view showing a display apparatus according to another exemplary embodiment of the present invention.

FIG. 8 is a plan view showing a display apparatus according to another exemplary embodiment of the present invention.

Referring to FIG. 8, a display apparatus 300 includes a display panel 100 for displaying an image, a data driver 210 for supplying data signals to the display panel 100, and a gate driver 220 for supplying gate signals to the display panel 100.

The structure of the display panel 100 has been described in detail above, and thus the detailed description of the display panel 100 shown in FIG. 8 will be omitted.

The data driver 210 is connected to the first to m-th data lines DL1 to DLm and supplies the data signals D1 to Dm to the first to m-th data lines DL1 to DLm, respectively. In the present exemplary embodiment, the data driver 210 includes chips that may be mounted on the display panel 100 or on a film attached to the display panel 100.

The gate driver 220 is connected to the first to n-th gate lines GL1 to GLn and sequentially supplies the gate signals G1 to Gn to the first to n-th gate lines GL1 to GLn, respectively. In the present exemplary embodiment, the gate driver 220 may include chips mounted on the display panel 100 or on a film attached to the display panel 100.

Figure 9:
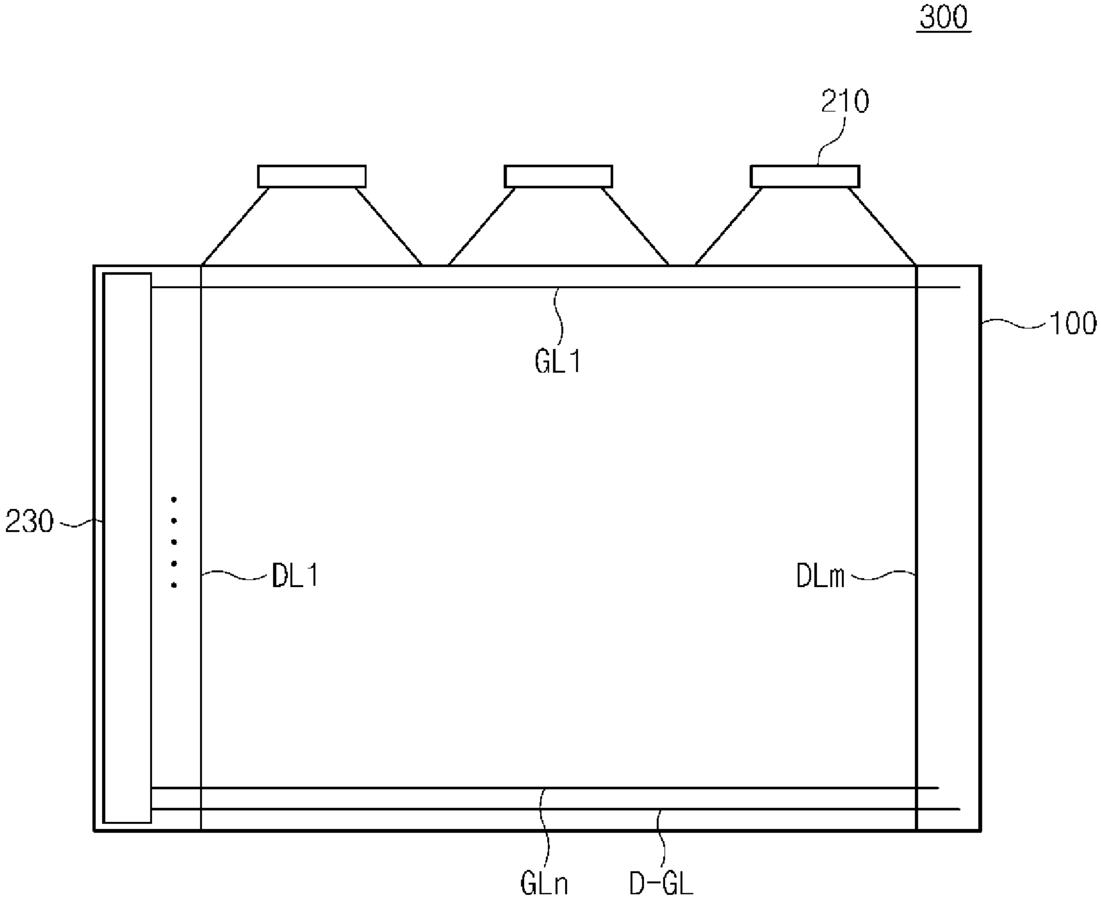
FIG. 9 is a plan view showing a display apparatus according to another exemplary embodiment of the present invention.
Figure 10:
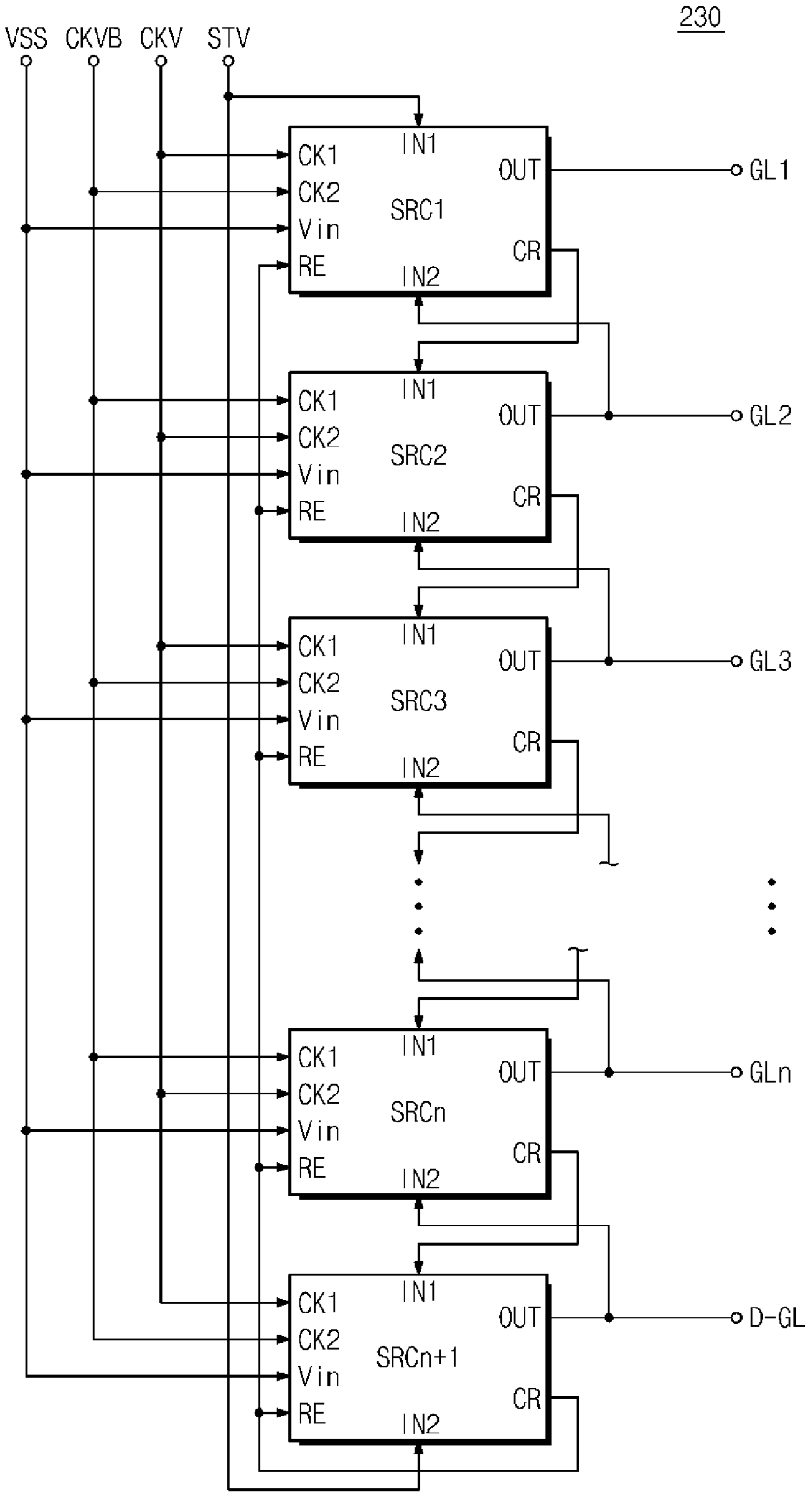
FIG. 10 is a block diagram of the gate driver shown in FIG. 9.

FIG. 9 is a plan view showing a display apparatus according to another exemplary embodiment of the present invention. FIG. 10 is a block diagram of the gate driver shown in FIG. 9. In FIG. 9, the same reference numerals denote the same or similar elements in FIG. 8, and thus the detailed description of the same elements will be omitted.

In the exemplary embodiment of the present invention shown in FIG. 9, the gate driver 230 may be directly arranged on the display panel 100 through a thin film process. A gate driver 230 that is directly arranged on the display panel 100 and having an amorphous silicon gate (ASG) type will be described in detail now with reference to FIG. 9 and FIG. 10.

Referring to FIG. 9, a gate driver 230 having an ASG type is directly arranged on a display panel 100 through a thin film process.

The gate driver 230 is connected to first to n-th gate lines GL1 to GLn, and is also connected to the dummy gate line D-GL. The gate driver 230 sequentially supplies gate signals G1 to Gn to the first to n-th gate signals GL1 to GLn, respectively, and supplies a dummy gate signal Gn+1 to the dummy gate line D-GL. Thus, the dummy gate line D-GL receives a separate dummy gate signal Gn+1 and does not need to be connected to the first gate line GL1 to receive the first gate signal G1.

Referring to FIG. 10, the gate driver 230 includes a shift register including plural stages SRC1 to SRCn+1 coupled together in series. Each stage SRC1 to SRCn+1 includes a first input terminal IN1, a first clock terminal CK1, a second clock terminal CK2, a second input terminal IN2, a voltage input terminal Vin, a reset terminal RE, an output terminal OUT, and a carry terminal CR.

The first input terminal IN1 of each stage SRC2 to SRCn+1 is connected to the carry terminal CR of a previous stage to receive a previous carry voltage. In the present exemplary embodiment, the first input terminal IN1 of the first stage SRC1 receives a start signal STV that initiates the driving of the gate driving circuit 230. The second input terminal IN2 of each stage SRC1 to SRCn is connected to the output terminal OUT of a next stage to receive a next gate voltage. The second input terminal IN2 of a dummy stage SRCn+1 also receives the start signal STV.

The first clock terminals CK1 of odd-numbered stages SRC1, SRC3, . . . , SRCn+1 receive a first clock CKV. The second clock terminals CK2 of odd-numbered stages SRC1, SRC3, . . . , SRCn+1 receive a second clock CKVB having a phase opposite to the first clock CKV. On the contrary, the first clock terminals CK1 of even-numbered stages SRC2, . . . , SRCn receive the second clock CKVB. The second clock terminals CK2 of even-numbered stages SRC2, . . . , SRCn receive the first clock CKV.

The voltage input terminal Vin of each stage SRC1 to SRCn+1 receives a source power voltage VSS. Also, the carry terminal CR of the dummy stage SRCn+1 is connected to the reset terminal RE of each stage SRC1 to SRCn+1.

The output terminal OUT of each stage SRC1 to SRCn is connected to a corresponding gate line of the first to n-th gate lines GL1 to GLn. Therefore, the stages SRC1 to SRCn may sequentially output the gate signals G1 to Gn through the output terminals OUT to apply the gate signals G1 to Gn to the first to n-th gate lines GL1 to GLn.

In order to reset an n-th stage SRCn, the dummy stage SRCn+1 is included in the gate driver 230. That is, the first to n-th stages SRC1 to SRCn each may be reset by a next stage. Therefore, the dummy stage SRCn+1 is included in the gate driver 230 as the next stage of the n-th stage SRCn, so that the n-th stage SRCn may be reset by the dummy stage SRCn+1. Particularly, the output terminal OUT of the dummy stage SRCn+1 is connected to the second input terminal IN2 of the n-th stage SRCn, and the n-th stage SRCn is reset by a dummy gate signal Gn+1 from the dummy stage SRCn+1.

As shown in FIG. 9, the output terminal OUT of the dummy stage SRCn+1 is connected to the dummy gate line D-GL arranged on the display panel 100. The dummy gate signal Gn+1 from the dummy stage SRCn+1 is applied to the dummy gate line D-GL. The dummy gate signal Gn+1 applied to the dummy gate line D-GL controls a first pixel voltage charged in the first sub pixel and a second pixel voltage charged in the second sub pixel of the n-th pixel, as described above.

In accordance with the exemplary embodiment described with reference to FIG. 1, the dummy voltage controller S2 controls the first pixel voltage charged in the first sub pixel P1 and the second pixel voltage charged in the second sub pixel P2 of the n-th pixel in a present frame in response to the first gate signal G1 applied to the first gate line GL1 in the next frame. However, a blank period may exist between two adjacent frames, and the gate signals may not be applied to the first to n-th gate line GL1 to GLn during the blank period. As a result, a time to control the first pixel voltage charged in the first sub pixel P1 and the second pixel voltage charged in the second sub pixel P2 may be delayed by the blank period.

In accordance with the exemplary embodiment described with reference to FIG. 9, the dummy gate signal Gn+1 is generated by the dummy stage SRCn+1 after the n-th 1H period where the n-th pixel is turned on without a delay during a blank period. Therefore, the first pixel voltage charged in the first sub pixel P1 and the second pixel voltage charged in the second sub pixel P2 in the n-th pixel within the present frame may be controlled after the n-th 1H period without an intervening blank period, thereby preventing the time to control the first pixel voltage and the second pixel voltage charged in the n-th pixel from being delayed.

Further, as shown in FIG. 10, the second input terminal IN2 of the dummy stage SRCn+1 receives the start signal STV, so that the dummy stage SRCn+1 is reset in response to the start signal STV.

Although not shown in figures, the gate driver 230 may include chips arranged on the display panel 100, and a last chip may be designed to output the dummy gate signal Gn+1 for the dummy gate line D-GL.

Figure 11:
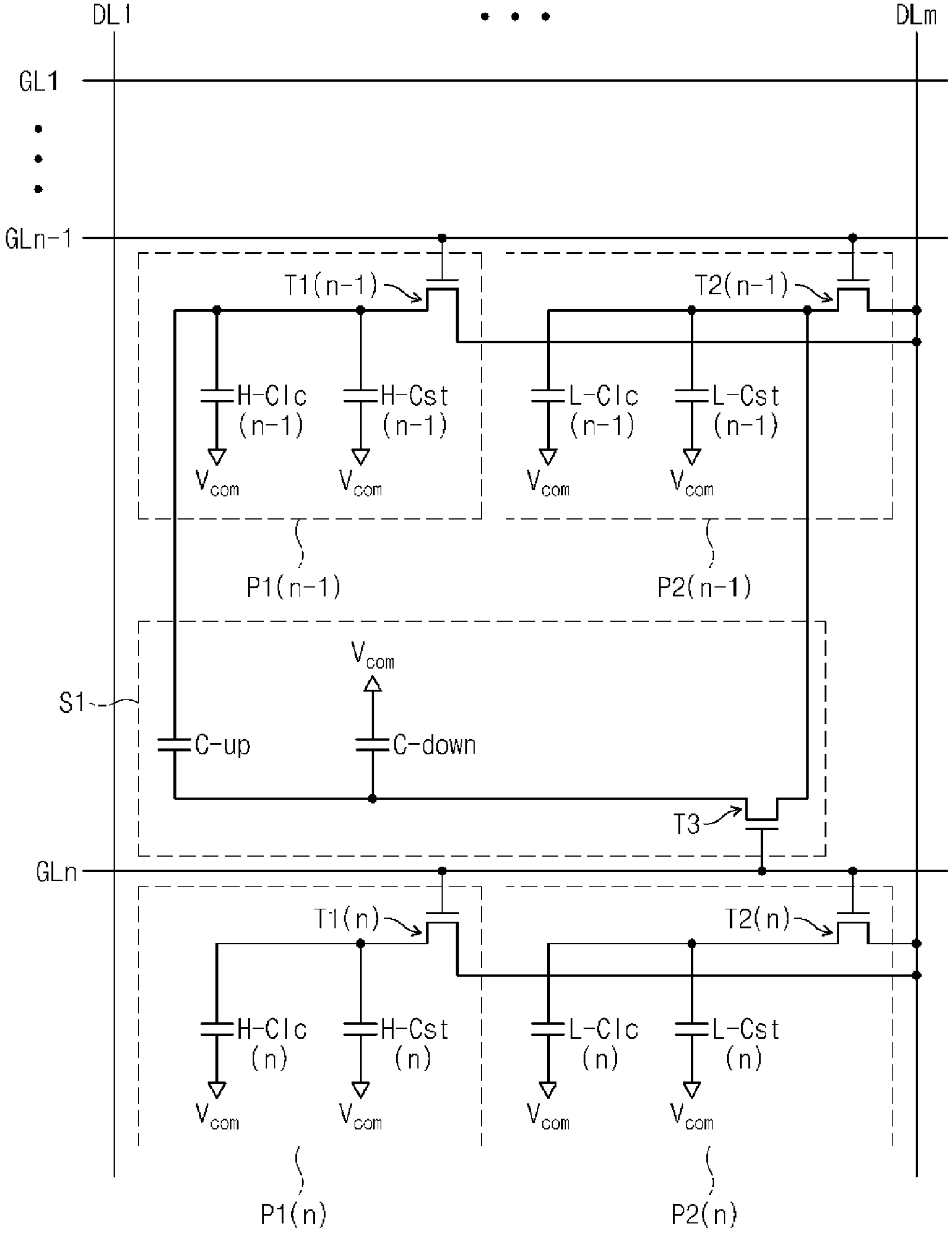
FIG. 11 is an equivalent circuit diagram of a pixel arranged in a display apparatus according to another exemplary embodiment of the present invention.

FIG. 11 is an equivalent circuit diagram of a pixel arranged in a display apparatus according to another exemplary embodiment of the present invention.

In FIG. 11, an (n−1)-th pixel connected to the (n−1)-th gate line GLn−1 and the m-th data line DLm and an n-th pixel connected to the n-th gate line GLn and the m-th data line DLm are shown.

Referring to FIG. 11, an n-th pixel includes a first sub pixel P1(*n*) and a second sub pixel P2(*n*). The first sub pixel P1(*n*) includes a first TFT T1(*n*), a first liquid crystal capacitor H-Clc(n), and a first storage capacitor H-Cst(n). The second sub pixel P2(*n*) includes a second TFT T2(*n*), a second liquid crystal capacitor L-Clc(n), and a second storage capacitor L-Cst(n).

The first TFT T1(*n*) and the second TFT T2(*n*) are connected to an n-th gate line GLn and an m-th data line DLm. When an n-th gate signal Gn is applied to the n-th gate line GLn, the first TFT T1(*n*) and the second TFT T2(*n*) are turned on, and a data signal Dm applied through the m-th data line DLm is transmitted to an electrode of the first liquid crystal capacitor H-Clc(n) via the first TFT T1(*n*) and to an electrode of the second liquid crystal capacitor L-Clc(n) via the second TFT T2(*n*). The first liquid crystal capacitor H-Clc(n) is charged to a first pixel voltage, and the second liquid crystal capacitor L-Clc(n) is charged to a second pixel voltage by the data signal. The first pixel voltage and the second pixel voltage may have a same voltage level.

However, the n-th gate signal GLn is a last gate line of the display apparatus. Therefore, unlike the (n−1)-th pixel, the n-th pixel does not include a voltage controller for controlling the first pixel voltage and the second pixel voltage charged in the n-th pixel. In order to prevent the whitening phenomenon in the pixels corresponding to the last gate line GLn, the display apparatus according to the present exemplary embodiment may employ a black matrix that will be described in detail below.

Figure 12A:
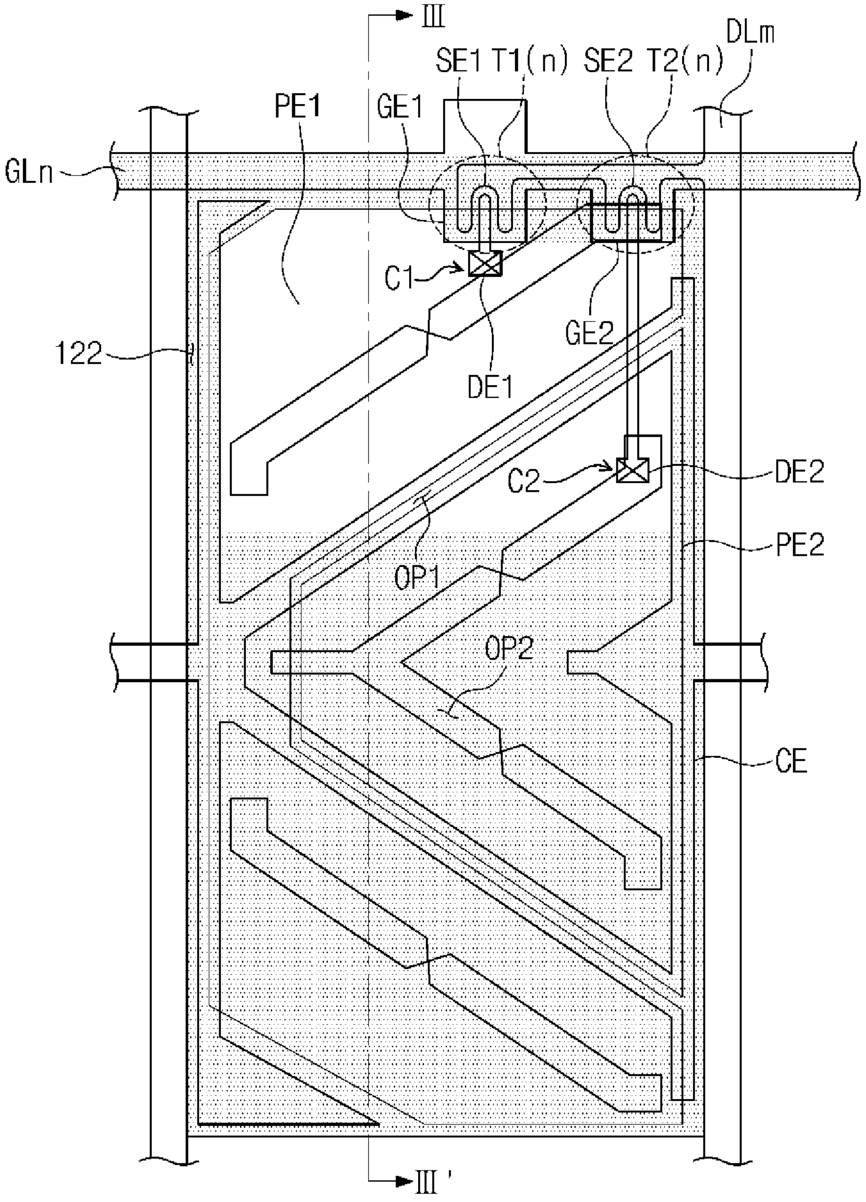
FIG. 12A is a layout diagram of an n-th pixel shown in FIG. 11.
Figure 12B:
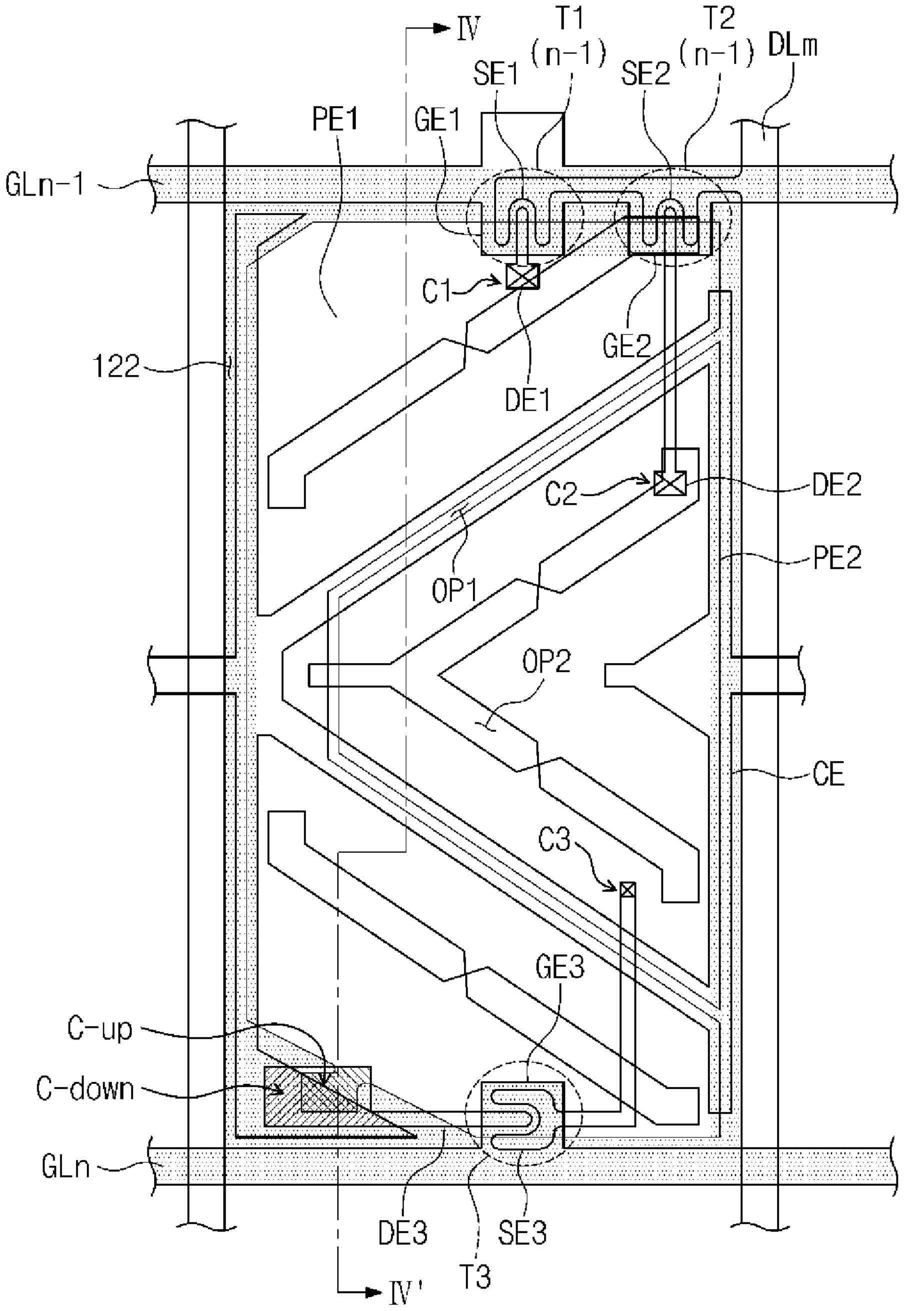
FIG. 12B is a layout diagram of an (n−1)-th pixel shown in FIG. 11.
Figure 13A:
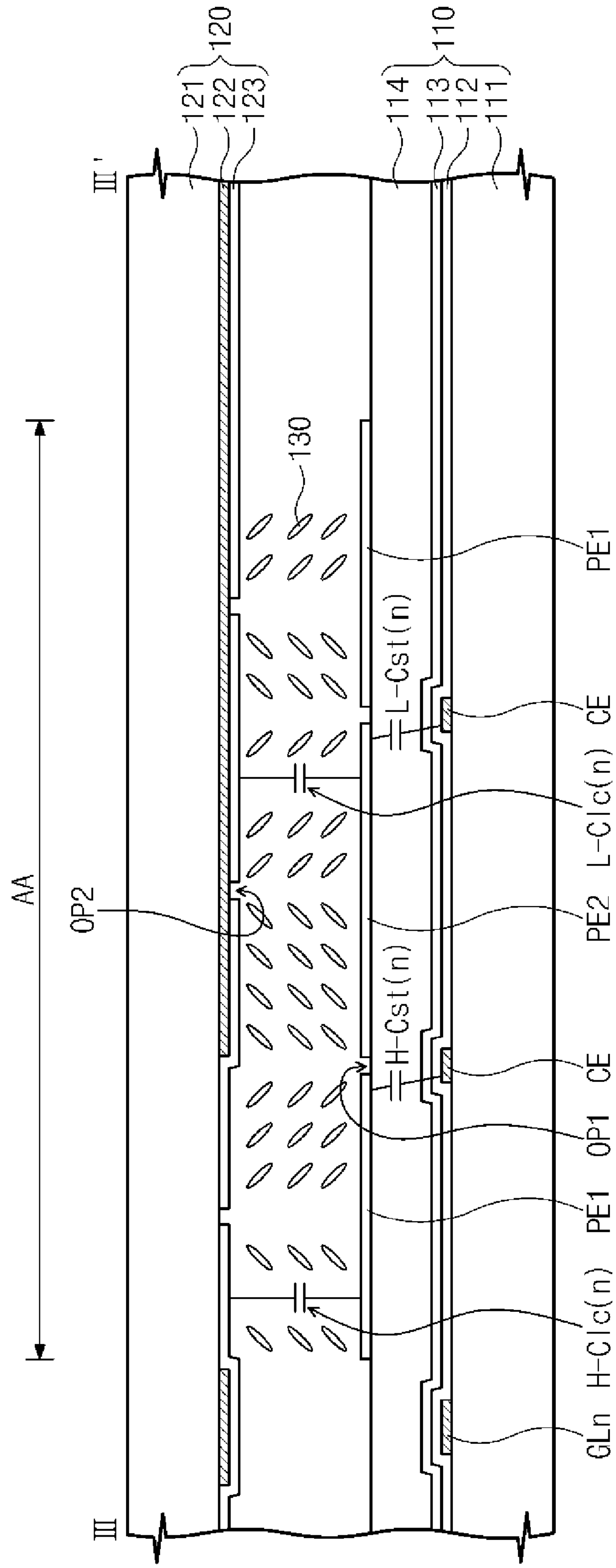
FIG. 13A is a sectional view taken along line III-III' shown in FIG. 12A.
Figure 13B:
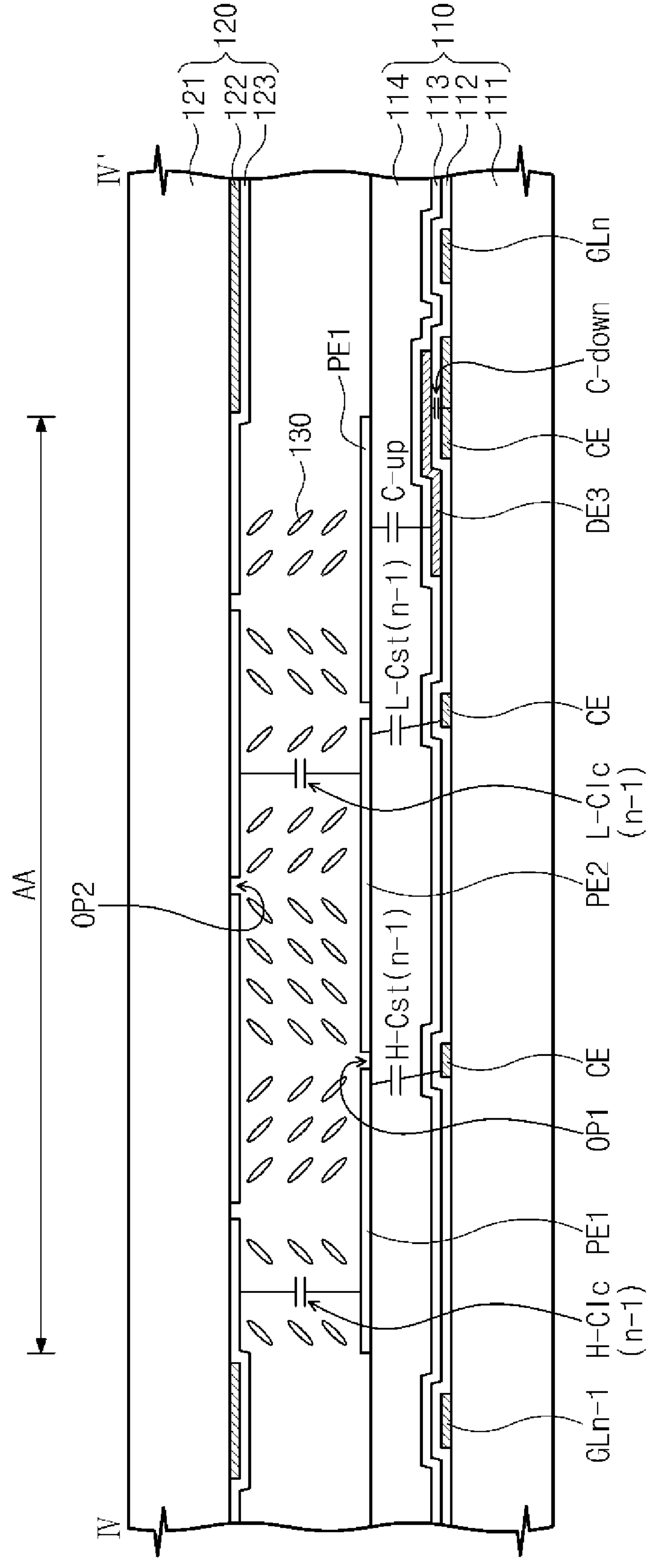
FIG. 13B is a sectional view taken along line IV-IV' shown in FIG. 12B.

FIG. 12A is a layout diagram of an n-th pixel shown in FIG. 11. FIG. 12B is a layout diagram of an (n−1)-th pixel shown in FIG. 11. FIG. 13A is a sectional view taken along line III-III' shown in FIG. 12A. FIG. 13B is a sectional view taken along line IV-IV' shown in FIG. 12B.

Hereinafter, a structure of the n-th pixel will be described with reference to FIG. 12A and FIG. 13A.

As shown in FIG. 12A and FIG. 13A, the display apparatus includes an array substrate 110, an opposite substrate 120 opposite to the array substrate 110, and a liquid crystal layer 130 interposed between the array substrate 110 and the opposite substrate 120.

The array substrate 110 includes a first base substrate 111 on which an n-th gate line GLn and a storage electrode CE are arranged. The storage electrode CE receives a common voltage, and the n-th gate line GLn receives the n-th gate signal Gn.

A first gate electrode GE1 and a second gate electrode GE2 extend from the n-th gate line GLn and are arranged on the base substrate 111. The n-th gate line GLn, the storage electrode CE, the first gate electrode GE1, and the second gate electrode GE2 are covered by a gate insulation layer 112 arranged on the base substrate 111. The m-th data line DLm, a first source electrode SE1, a second source electrode SE2, a first drain electrode DE1, and a second drain electrode DE2 are arranged on the gate insulation layer 112. The first source electrode SE1 and the second source electrode SE2 extend from the m-th data line DLm. The first drain electrode DEL and the second drain electrode DE2 are spaced apart from the first source electrode SE1 and the second source electrode SE2, respectively. Therefore, the first TFT T1(*n*) having the first gate electrode GE1, the first source electrode SE1, and the first drain electrode DE1 is arranged on the array substrate 110. The second TFT T2(*n*) having the second gate electrode GE2, the second source electrode SE2, and the second drain electrode DE2 is also arranged on the array substrate 110.

The array substrate 110 includes a passivation layer 113 and an organic insulation layer 114, which both cover the first TFT T1(*n*) and the second TFT T2(*n*). The passivation layer 113 and the organic insulation layer 114 are sequentially coated on the gate insulation layer 112. A first contact hole C1 and a second contact hole C2 are arranged through the passivation layer 113 and the organic insulation layer 114. The first contact hole C1 exposes the first drain electrode DE1, and the second contact hole C2 exposes the second drain electrode DE2.

A first pixel electrode PE1 and a second pixel electrode PE2 are arranged on the organic insulation layer 114. A first opening OP1 is provided between the first pixel electrode PE1 and the second pixel electrode PE2, so that the first pixel electrode PE1 and the second pixel electrode PE2 are insulated from each other.

The first pixel electrode PE1 is connected to the first drain electrode DEL via the first contact hole C1, and the second pixel electrode PE2 is connected to the second drain electrode DE2 via the second contact hole C2. The first pixel electrode PE1 partially overlaps with the storage electrode CE to form the first storage capacitor H-Cst(n), and the second pixel electrode PE2 partially overlaps with the storage electrode CE to form the second storage capacitor L-Cst(n).

The opposite substrate 120 includes a second base substrate 121, a black matrix 122, and a common electrode 123. The black matrix 122 is arranged in a non-effective display area adjacent to an effective display area AA on which an image is displayed. The black matrix 122 may block light leakage from the non-effective display area.

As shown in FIG. 12A and FIG. 13A, the black matrix 122 may extend into the effective display area AA of the n-th pixel to partially cover the effective display area AA of the n-th pixel. Since the whitening phenomenon may occur if the n-th pixel becomes brighter than the other pixels, the black matrix 122 partially covers the n-th pixel so the n-th pixel may have a similar brightness to that of the other pixels. Therefore, the whitening phenomenon of the n-th pixel may be reduced or prevented.

In the present exemplary embodiment, the black matrix 122 may cover about 50% to about 70% of the effective display area AA of the n-th pixel. Particularly, the black matrix 122 may cover a portion of the first pixel electrode PE1 and the second pixel electrode PE2 to block the light leakage and to reduce or prevent the whitening phenomenon.

The common electrode 123 is disposed on the black matrix 122 and the second base substrate 121. A second opening OP2 is arranged in the common electrode 123 to divide the pixel areas corresponding to the first pixel electrode PE1 and the second pixel electrode PE2 into domains. The second opening OP2 is arranged such that a position of the second opening OP2 does not correspond with a position of the first opening OP1.

The liquid crystal layer 130 is interposed between the array substrate 110 and the opposite substrate 120. Thus, the first liquid crystal capacitor H-Clc(n) includes the common electrode 123, the first pixel electrode PE1, and the liquid crystal layer 130, and the second liquid crystal capacitor L-Clc(n) includes the common electrode 123, the second pixel electrode PE2, and the liquid crystal layer 130.

Since the n-th pixel is not connected to a voltage controller, the first liquid crystal capacitor H-Clc(n) and the second liquid crystal capacitor L-Clc(n) are charged to a same voltage throughout one frame. As a result, the n-th pixel may be brighter than the other pixels. However, the effective display area AA of the n-th pixel is partially covered by the black matrix 122, thereby decreasing the whitening phenomenon on a screen of the display apparatus.

Hereinafter, a structure of the (n−1)-th pixel will be described in detail with reference to FIG. 12B and FIG. 13B. In FIG. 12B and FIG. 13B, the same reference numerals denote the same elements in FIGS. 12A and 13A, and thus the detailed descriptions of the same elements will be omitted.

As shown in FIG. 12B and FIG. 13B, the (n−1)-th gate line GLn−1, the n-th gate line GLn, and the storage electrode CE are arranged on the first base substrate 111 of the array substrate 110 using the gate metal. The (n−1)-th gate line GLn−1 and the n-th gate line GLn extend substantially parallel to each other, and the storage electrode CE is arranged between the (n−1)-th gate line GLn−1 and the n-th gate line GLn.

A first gate electrode GE1, a second gate electrode GE2, and a third gate electrode GE3 are arranged on the first base substrate 111. The first gate electrode GE1 and the second gate electrode GE2 extend from the (n−1)-th gate line GLn−1, and the third gate electrode GE3 extends from the n-th gate line GLn.

The m-th data line DLm, a first source electrode SE1, a second source electrode SE2, a first drain electrode DE1, and a second drain electrode DE2 are arranged on the gate insulation layer 112. The first source electrode SE1 and the second source electrode SE2 extend from the m-th data line DLm, and the first drain electrode DE1 and the second drain electrode DE2 are spaced apart from the first source electrode SE1 and the second source electrode SE2, respectively. Therefore, a first TFT T1(*n*−1) having the first gate electrode GE1, the first source electrode SE1, and the first drain electrode DE1 is arranged on the array substrate 110. A second TFT T2(*n*−1) having the second gate electrode GE2, the second source electrode SE2, and the second drain electrode DE2 is also arranged on the array substrate 110.

Also, a third source electrode SE3 and a third drain electrode DE3 are further arranged on the gate insulation layer 112 and are spaced apart from each other in an area corresponding to the third gate electrode GE3, so that a third TFT T3 having the third gate electrode GE3, the third source electrode SE3, and the third drain electrode DE3 is arranged on the array substrate 110. The third drain electrode DE3 partially overlaps with the storage electrode CE to form a first control capacitor C-down.

The first pixel electrode PE1 and the second pixel electrode PE2 are arranged on the array substrate 110. The first pixel electrode PE1 is connected to the first drain electrode DE1 via a first contact hole C1, and the second pixel electrode PE2 is connected to the second drain electrode DE2 via a second contact hole C2. Also, the second pixel electrode PE2 is connected to the third source electrode SE3 via a third contact hole C3, and the first pixel electrode PE1 partially overlaps with the third drain electrode DE3 to form a second control capacitor C-up.

When an (n−1)-th gate signal G(n−1) is applied to the (n−1)-th gate line GLn−1, the first TFT T1(*n*−1) and the second TFT T2(*n*−1) are turned on, and the data signal Dm applied to the m-th data line DLm is applied to the first pixel electrode PE1 and the second pixel electrode PE2 via the first TFT T1(*n*−1) and the second TFT T2(*n*−1), respectively. Then, when the third TFT T3 is turned on in response to an n-th gate signal Gn applied through the n-th gate line, the first control capacitor C-down and the second control capacitor C-up control electric potentials of the first pixel electrode PE1 and the second pixel electrode PE2 so the first pixel electrode PE1 and the second pixel electrode PE2 have different electric potentials from each other.

As described above, when the first pixel electrode PE1 and the second pixel electrode PE2 have different electric potentials, two images having different gray-scales are displayed on two areas corresponding to the first pixel electrode PE1 and the second pixel electrode PE2, and the user views an image combining the two images mixed with each other, to thereby improve the side visibility of the display apparatus.

The opposite substrate 120 includes the black matrix 122 arranged corresponding to the non-effective display area adjacent to the effective display area AA to prevent the light leakage from the non-effective area.

As shown in FIG. 12B and FIG. 13B, since the (n−1)th pixel has a next gate line GLn, the first pixel voltage and the second pixel voltage charged in the (n−1)-th pixel are controlled by the first control capacitor C-down and the second control capacitor C-up. As a result, the black matrix 122 may cover only the non-effective display area adjacent to the effective display area AA of the pixels.

According to the above, the display apparatus may include a dummy voltage controller to control the voltage level of the first and second pixel voltages charged in the pixels connected to the last gate line, and the dummy voltage controller controls the voltage level of the first and second pixel voltages in response to a dummy gate signal applied through the dummy gate line. Therefore, the whitening phenomenon in the pixels associated with the last gate line may be reduced or prevented, thereby improving the display quality of the display apparatus.

Also, the black matrix that is disposed on the opposite substrate and arranged in a peripheral region between the pixels may partially cover the effective display area of pixels associated with the last gate line. Thus, a whitening phenomenon, whereby pixels associated with the last gate line become brighter than the other pixels, may be reduced or prevented since the black matrix may decreases brightness of the pixels of the last gate line, thereby improving the display quality of the display apparatus.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A display apparatus, comprising:

a plurality of gate lines to receive a plurality of gate signals;

a dummy gate line to receive a dummy gate signal;

a plurality of data lines to receive a data signal; and a plurality of pixels arranged in pixel areas defined by a crossing arrangement of the gate lines and the data lines, each pixel comprising a first sub pixel being charged to a first pixel voltage and a second sub pixel being charged to a second pixel voltage, wherein a pixel corresponding to a penultimate gate line further comprises: a voltage controller to decrease the second pixel voltage charged in the pixel corresponding to the penultimate gate line in response to a last gate signal, and wherein a pixel corresponding to a last gate line further comprises: a dummy voltage controller to decrease the second pixel voltage charged in the pixel corresponding to the last gate line in response to the dummy gate signal, the dummy gate line being connected to the pixel corresponding to the last gate line.

2. The display apparatus of claim 1, wherein a first gate signal of the plurality of gate signals that is applied to a first gate line corresponding to a first row of pixels is also applied to the dummy gate line as the dummy gate signal, the first gate line and the dummy gate line being on opposite sides of the display apparatus.

3. The display apparatus of claim 2, wherein the dummy gate line is connected to the first gate line.

4. The display apparatus of claim 1, wherein the first pixel voltage and the second pixel voltage have a same voltage level before the first pixel voltage and the second pixel voltage are controlled by the voltage controller or the dummy voltage controller.

5. The display apparatus of claim 4, wherein the first sub pixel comprises:

a first switching device to output the data signal in response to the corresponding gate signal; and a first liquid crystal capacitor to charge the first pixel voltage, comprising:

a first pixel electrode connected to an output terminal of the first switching device; and a common electrode to receive a common voltage, and wherein the second sub pixel comprises:

a second switching device to output the data signal in response to the corresponding gate signal; and a second liquid crystal capacitor to charge the second pixel voltage, comprising:

a second pixel electrode connected to an output terminal of the second switching device; and the common electrode.

6. The display apparatus of claim 5, wherein the voltage controller comprises:

a first control capacitor to decrease the second pixel voltage charged in the pixel corresponding to the penultimate gate line, the first control capacitor comprising a storage electrode to receive the common voltage and a first opposite electrode facing the storage electrode;

a second control capacitor to increase the first pixel voltage charged in the pixel corresponding to the penultimate gate line, the second control capacitor comprising the first pixel electrode and the first opposite electrode; and a third switching device to connect the second pixel electrode to the first opposite electrode in response to the next gate signal.

7. The display apparatus of claim 6, wherein the dummy voltage controller comprises:

a third control capacitor to decrease the second pixel voltage charged in the pixel corresponding to the last gate line, the third control capacitor comprising the storage electrode and a second opposite electrode facing the storage electrode;

a fourth control capacitor to increase the first pixel voltage charged in the pixel corresponding to the last gate line, the fourth control capacitor comprising the first pixel electrode and the second opposite electrode; and a fourth switching device to connect the second pixel electrode to the second opposite electrode in response to the dummy gate signal.

8. The display apparatus of claim 7, wherein the dummy gate line is connected to a first gate line corresponding to a first row of pixels, and the dummy gate line receives a first gate signal applied to the first gate line as the dummy gate signal.

9. The display apparatus of claim 8, further comprising at least one connection line, the at least one connecting line connecting the dummy gate line with the first gate line.

10. The display apparatus of claim 9, wherein the at least one connection line is insulated from gate lines other than the first gate line and the dummy gate line.

11. The display apparatus of claim 7, further comprising a gate driver to sequentially output the gate signals to the gate lines, the gate driver being connected to the dummy gate line to supply the dummy gate signal to the dummy gate line.

12. The display apparatus of claim 5, wherein the first sub pixel further comprises a first storage capacitor connected to the first liquid crystal capacitor in parallel and comprising the storage electrode and the first pixel electrode, and the second sub pixel further comprises a second storage capacitor connected to the second liquid crystal capacitor in parallel and comprising the storage electrode and the second pixel electrode.

13. A display apparatus, comprising:

a first base substrate;

a second base substrate facing the first base substrate;

a plurality of gate lines arranged on the first base substrate to sequentially receive a plurality of gate signals;

a plurality of data lines to receive a data signal, the data lines being electrically insulated from and crossing with the gate lines to define a plurality of pixel areas, each pixel area comprising an effective display area configured to display an image and a non-effective display area adjacent to the effective display area;

a plurality of pixels arranged by row in the pixel areas, wherein each row of pixels corresponds to one of the plurality of gate lines; and a black matrix disposed between the first base substrate and the second base substrate to partially cover the effective display area of a pixel corresponding to a last gate line, wherein the black matrix covers a first portion of the effective display area of the pixel corresponding to the last gate line but does not cover the first portion of the effective display area of a pixel corresponding to another gate line;

wherein each pixel comprises:

a first sub pixel to receive the data signal in response to a corresponding gate signal, the first sub pixel being charged to a first pixel voltage; and a second sub pixel to receive the data signal in response to the corresponding gate signal, the second sub pixel being charged to a second pixel voltage, and wherein a pixel corresponding to a gate line other than the last gate line further comprises:

a voltage controller to control the first pixel voltage and the second pixel voltage in response to a next gate signal after the corresponding gate signal.

14. The display apparatus of claim 13, wherein the black matrix covers about 50% to about 70% of the effective display area of the pixel corresponding to the last gate line.

15. The display apparatus of claim 13, wherein the black matrix covers the non-effective display area adjacent to the effective display area in each pixel.

16. The display apparatus of claim 15, wherein the black matrix is disposed on the second base substrate.

17. The display apparatus of claim 13, wherein the first pixel voltage and the second pixel voltage have a same voltage level before the voltage controller controls the first pixel voltage and the second pixel voltage.

18. The display apparatus of claim 17, wherein the first sub pixel comprises:

a first switching device to output the data signal in response to the corresponding gate signal; and a first liquid crystal capacitor to charge the first pixel voltage, comprising:

a first pixel electrode connected to an output terminal of the first switching device; and a common electrode to receive a common voltage, and wherein the second sub pixel comprises:

a second switching device to output the data signal in response to the corresponding gate signal; and a second liquid crystal capacitor to charge the second pixel voltage, comprising:

a second pixel electrode connected to an output terminal of the second switching device; and the common electrode.

19. The display apparatus of claim 18, wherein the voltage controller comprises:

a first control capacitor to decrease the second pixel voltage, comprising a storage electrode to receive the common voltage and an opposite electrode facing the storage electrode;

a second control capacitor to increase the first pixel voltage, comprising the first pixel electrode and the opposite electrode; and a third switching device to connect the second pixel electrode to the opposite electrode in response to the next gate signal.

20. The display apparatus of claim 18, wherein the first sub pixel further comprises a first storage capacitor connected in parallel with the first liquid crystal capacitor and comprising a storage electrode to receive the common voltage and the first pixel electrode, and the second sub pixel further comprises a second storage capacitor connected in parallel with the second liquid crystal capacitor and comprising the storage electrode and the second pixel electrode.

21. A method for driving a display apparatus, comprising:

charging a first sub pixel to a first pixel voltage and charging a second sub pixel to a second pixel voltage in response to a present gate signal, the first sub pixel and the second sub pixel being arranged in a first pixel corresponding to a last pixel row;

controlling a voltage level of a third pixel voltage charged in a third sub pixel and a fourth pixel voltage charged in a fourth sub pixel in response to the present gate signal, the third sub pixel and the fourth sub pixel being arranged in a second pixel corresponding to a previous pixel row before the last pixel row; and controlling a voltage level of the first pixel voltage and the second pixel voltage in response to a dummy gate signal received from a dummy gate line, the dummy gate line being connected to the first pixel corresponding to the last pixel row.

22. The method of claim 21, wherein in the step of charging, the first pixel voltage and the second pixel voltage have a same voltage level, and in the step of controlling a voltage level of the first pixel voltage and the second pixel voltage, the second pixel voltage has a voltage level lower than a voltage level of the first pixel voltage.

23. The method of claim 22, wherein a first gate signal of a next frame is used as the dummy gate signal of a present frame.

* * * * *

UNITED STATES PATENT AND TRADEMARK OFFICE

CERTIFICATE OF CORRECTION

PATENT NO. : 8,542,227 B2
APPLICATION NO. : 12/022512
DATED : September 24, 2013
INVENTOR(S) : You et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1140 days.

Signed and Sealed this
Third Day of March, 2015

Michelle K. Lee

Michelle K. Lee
*Deputy Director of the United States Patent and Trademark Office*